UNITED STATES PATENT OFFICE.

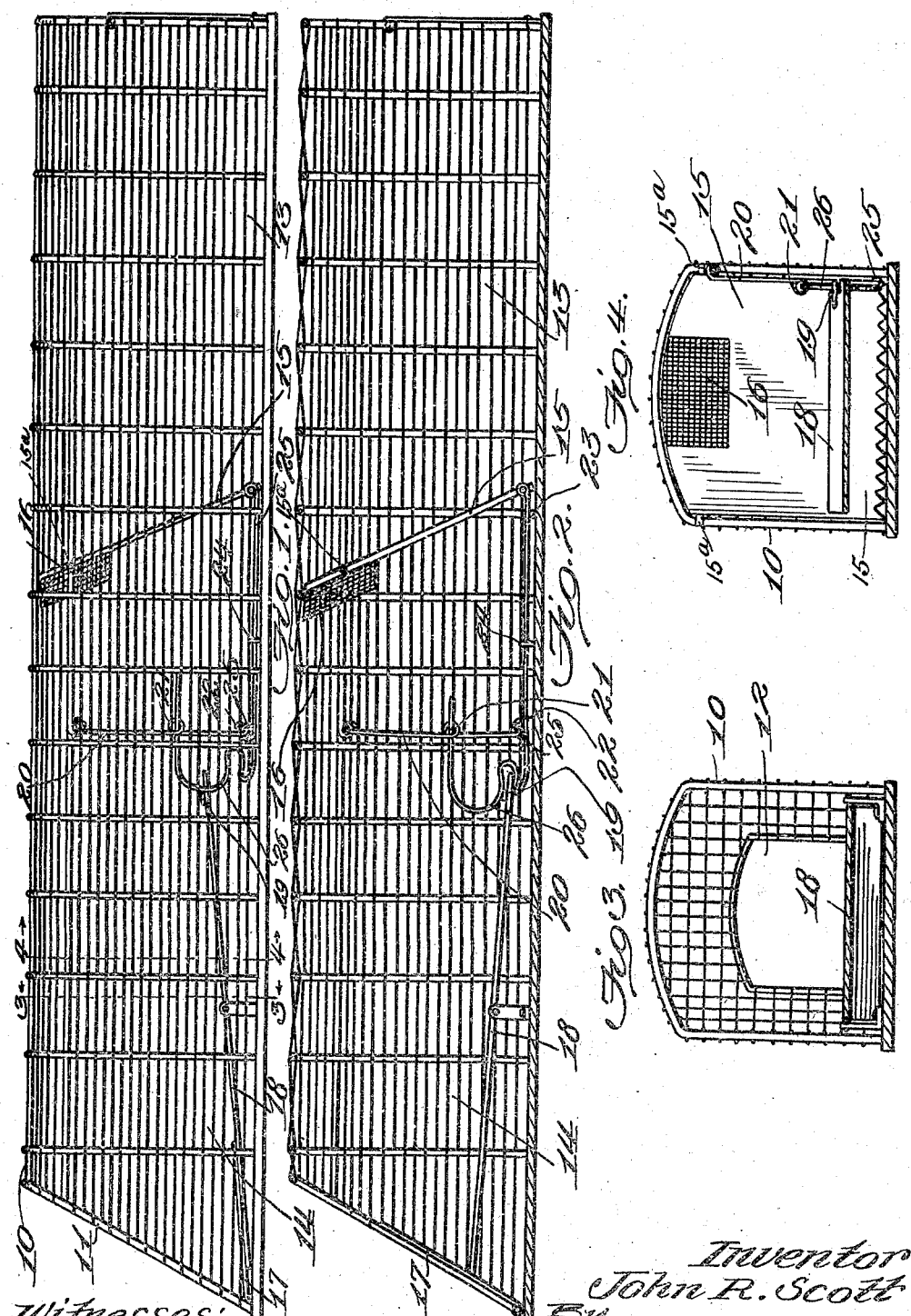

JOHN R. SCOTT, OF DALEVILLE, INDIANA.

RODENT-TRAP.

958,016.  Specification of Letters Patent.  Patented May 17, 1910.

Application filed September 22, 1909. Serial No. 519,051.

*To all whom it may concern:*

Be it known that I, JOHN R. SCOTT, a citizen of the United States, residing at Daleville, in the county of Delaware and State of Indiana, have invented certain new and useful Improvements in Rodent-Traps, of which the following is a specification.

My invention is a rodent trap of that type which automatically set themselves, and my object is to provide a simple and highly efficient trap by which a number of rodents, one after the other, may be entrapped and caged.

Other objects, and the advantages of my invention will be apparent from the following description, in which reference is made to the accompanying drawings, forming a part of this specification, and in which, Figure 1 is a side elevation of my improved trap, showing the parts in the open position. Fig. 2 is a central vertical sectional view therethrough, showing the parts closed. Fig. 3 is a transverse sectional view on line 3—3 of Fig. 1, and Fig. 4 is a similar view on line 4—4 of Fig. 1.

In the practical embodiment of my idea, I provide an elongated trap casing 10, of heavy wire mesh or the like, which is substantially rectangular in cross section, and has its forward end 11 sloping rearwardly and upwardly and provided with opening 12 by which the rodents may enter the trap. The casing 10 is divided intermediately into a rear cage portion 13 and a forward trap portion 14, by a transversely arranged door 15 hinged at its upper edge as shown at 15ª and extending diagonally rearwardly and downwardly upon the casing base, owing to which arrangement it may only be opened rearwardly or into the cage portion 13. This door carries the bait box 16.

At the base of the entrance opening 12 is hinged, at its lower edge, a door 17, for movement upwardly to close said opening, said door normally extending rearwardly upon the forward end of a pivoted platform 18. Platform 18 is pivoted substantially centrally, and at its sides to the casing sides, so that its forward end is normally held down by the weight of the door 17, and its rear end is cut away at one edge and provided with a laterally extending arm 19.

From a point in the upper portion of casing 10 above the cut away portion of the rear edge of platform 18, is pivotally suspended a rod 20 having a central loop 21 and a lower hook 22. A second rod 23, preferably of spring wire is pivotally connected at its rear end to the lower edge of door 15, and extends forwardly through a guide 24. The forward portion of wire 23 is first bent to form a loop 25 through which the lower hook 22 of rod 20 is engaged, and is then bent to form an S-shaped trigger 26, the free end of which is passed through the intermediate loop 21 of rod 20. The arm 19 of the platform normally rests against the forward portion of the trigger 26, as shown in Fig. 1.

When a rodent enters the trap opening 12 and passes rearwardly over the pivot of platform 18, the rear end thereof is forced down, and the forward end raising, forces the door 17 upwardly over the entrance opening 12. At the same time the downward movement of the rear end of platform 18 forces the upper portion of trigger 26 rearwardly until arm 19 gets beneath the same, when it springs back thereover. Thus the rodent is locked within the trap portion and when he enters the cage portion 13, swinging door 15 rearwardly to do so, the trigger is drawn rearwardly with the rod 20, swung upon its upper pivot, which movement permits the platform 18 to swing back to its normal position under weight of the door 17. The door 15 swings back to closed position as soon as the rodent is within the cage portion 13 owing to its inclination.

I claim:

In a trap of the character described, the combination of a swinging door, a pivoted swinging platform, a depending swinging rod adjacent said platform, having an intermediate eye and a lower hook end, and a wire spring pivotally connected at one end to said swinging door and having an intermediate eye with which said lower hook end of said rod engages, said wire being bent adjacent the platform to form an S-shaped trigger having its free end extending through the intermediate eye of said rod.

In testimony whereof I affix my signature, in presence of two witnesses.

JOHN R. SCOTT.

Witnesses:
W. W. Cox,
S. J. HUNTER.